(12) United States Patent
Sloan et al.

(10) Patent No.: US 7,948,490 B2
(45) Date of Patent: May 24, 2011

(54) HARDWARE-ACCELERATED COMPUTATION OF RADIANCE TRANSFER COEFFICIENTS IN COMPUTER GRAPHICS

(75) Inventors: Peter-Pike J. Sloan, Bellevue, WA (US); John M. Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1621 days.

(21) Appl. No.: 10/692,361

(22) Filed: Oct. 22, 2003

(65) Prior Publication Data

US 2005/0088440 A1   Apr. 28, 2005

(51) Int. Cl.
*G06T 15/50* (2011.01)
(52) U.S. Cl. ............... 345/426; 345/419; 345/420
(58) Field of Classification Search .......... 345/584, 345/583
See application file for complete search history.

(56) References Cited

U.S. PATENT DOCUMENTS

| | | | | |
|---|---|---|---|---|
| 6,333,742 B1 * | 12/2001 | Morioka et al. | | 345/426 |
| 6,628,298 B1 * | 9/2003 | Debevec | | 345/632 |
| 6,650,327 B1 * | 11/2003 | Airey et al. | | 345/422 |
| 6,791,544 B1 * | 9/2004 | Hong et al. | | 345/426 |
| 2005/0041023 A1 * | 2/2005 | Green | | 345/426 |

OTHER PUBLICATIONS

Foley et al., Computer Graphics: Principles and Practice, 1990, Addison-Wesley, Second Edition, pp. 723-725, 741-745, 751-753, 761-763.*
Purcell, T., Buck, I., Mark, W., Hanrahan, P., Ray Tracing on Programmable Graphics Hardware, Jul. 2002, vol. 21 Issue 3, ACM Transactions on Graphics, pp. 703-712.*
Arvo, J., Dutre, P., Keller, A., Jensen, H., Owen, A., Phar, M., Shirley, P., Monte Carlo Ray Tracing, Jul. 2003, SIGGRAPH 2003, pp. 1-5, 13-42.*
Purcell, T., Buck, I., Mark, W., Hanrahan, P., Ray Tracing on Programmable Graphics Hardware, Jul. 2002, ACM Transactions on Graphics, Proceedings of ACM SIGGRAPH 2002, pp. 703-712.*
Agrawala et al., "Efficient Image-Based Methods for Rendering Soft Shadows", *SIGGRAPH 2000*, pp. 375-384.
Airey et al., "Towards Image Realism with Interactive Update Rates in Complex Virtual Building Environments", *1990 Symposium on Interactive 3-D Graphics*, 24(2), pp. 41-50.
Ashikhmin et al., "Steerable Illumination Textures", *ACM Transactions on Graphics* Jan. 2002, 2(3) (To Appear), pp. 1-19.
Cabral et al., "Bidirectional Reflection Functions from Surface Bump Maps", *SIGGRAPH 1987*, pp. 273-281.
Cabral et al., "Reflection Space Image Based Rendering", *SIGGRAPH 1999*, pp. 165-170.
Cohen et al., "Radiosity and Realistic Image Synthesis", *Academic Press Professional*, Cambridge, 1993, pp. 13-107.

(Continued)

*Primary Examiner* — Said Broome
(74) *Attorney, Agent, or Firm* — Klarquist Sparkman, LLP

(57) ABSTRACT

A hardware-accelerated process of computing radiance transfer coefficients (such as for use in image rendering based on precomputed radiance transfer (PRT) techniques) is re-ordered as compared to previously known PRT precomputations to iterate over a sampling of directions about an object. The hardware-accelerated process uses a set of textures representing positions and normals for a sampling of points over a modeled object. In iterating over the directions, the process computes the depth of the object in a shadow buffer, then computes a texture of the radiance contribution based on the normal and position textures and depth from the shadow buffer. The resulting radiance contribution textures of the iterated directions are accumulated to produce a texture representing the radiance transfer coefficients of the sampled positions. This enables the process to avoid reduction operations, ray tracing and slow read-back path limitations of graphical processing units.

20 Claims, 7 Drawing Sheets

OTHER PUBLICATIONS

Cohen et al., "Radiosity and Realistic Image Synthesis", pp. 13-106 *Morgan Kaufmann Publishers, Inc.*, San Francisco, 1993.

Cook et al., "Distributed Ray Tracing", *SIGGRAPH 1984*, pp. 137-145.

Debevec, "Rendering Synthetic Objects into Real Scenes: Bridging Traditional and Image-based Graphics with Global Illumination and High Dynamic Range Photography", *SIGGRAPH 1998*, pp. 1-10.

Debevec et al., "Acquiring the Reflectance Field of a Human Face", *SIGGRAPH 2000*, pp. 1-12.

Dobashi et al., "A Quick Rendering Method Using Basis Functions for Interactive Lighting Design", *Eurographics 1995*, pp. 229-240.

Dorsey et al., "Design and Simulation of Opera Lighting and Projection Effects", *SIGGRAPH 1991*, pp. 41-50.

D'Zmura, "Shading Ambiguity: Reflectance and Illumination", *Computational Models of Visual Processing* (1991)*Landy and Movshon, eds., MIT Press*, Cambridge, pp. 187-207.

Edmonds, "Angular Momentum in Quantum Mechanics", *Princeton University Press*, 1957, pp. 68-89.

Greene, "Environment Mapping and Other Applications of World Projections", *IEEE CG&A*, 1986, 6(11), pp. 21-29.

Greger et al., "The Irradiance Volume", *IEEE Computer Graphics and Applications*, Mar./Apr. 1998, pp. 32-43.

Hakura et al., "Realistic Reflections and Refractions on Graphics Hardware With Hybrid Rendering and Layered Environment Maps", *Eurographics Workshop on Rendering*, 2001, pp. 289-300.

Haeberli et al., "The Accumulation Buffer: Hardware Support for High-Quality Rendering", *SIGGRAPH 1990*, pp. 309-318.

Heidrich et al., "Light Field Techniques for Reflections and Refractions", *Eurographics Rendering Workshop 1999*, pp. 195-375.

Heidrich et al., "Realistic, Hardware-accelerated Shading and Lighting", *SIGGRAPH 1999*, pp. 171-178.

Heidrich et al., "Illuminating Micro Geometry Based on Precomputed Visibility", *SIGGRAPH 2000*, pp. 455-464.

Jensen, "Global Illumination using Photon Maps", *Eurographics Workshop on Rendering 1996*, 21-30.

Jensen, "A Practical Model for Subsurface Light Transport", *SIGGRAPH 2001*, 8 pages.

Kautz et al., "Fast, Arbitrary BRDF Shading for Low-Frequency Lighting Using Spherical Harmonics", © The Eurographics Association 2002, *Thirteenth Eurographics Workshop on Rendering* (2002), 7 pages.

Kautz et al., "Fast, Arbitrary BRDF Shading for Low-Frequency Lighting Environments Using Spherical Harmonics", *Thirteenth Eurographics Workshop on Rendering 2002*.

Kautz et al., "Interactive Rendering with Arbitrary BRDFs using Separable Approximations", *Eurographics Workshop on Rendering 1999*, 247-260.

Kautz et al., "A Unified Approach to Prefiltered Environment Maps", *Eurographics Workshop on Rendering 2000*, pp. 185-196.

Kajiya, "The Rendering Equation", *SIGGRAPH 1986*, pp. 143-150.

Keating et al., "Shadow Penumbras for Complex Objects by Depth-Dependent Filtering of Multi-Layer Depth Images", *Eurographics Rendering Workshop*, 1996, pp. 196-211.

Keller, "Instant Radiosity", *SIGGRAPH 1997*, pp. 49-56.

Larson et al., "Indirect Calculation", *Rendering with Radiance, Morgan Kaufmann Publishers*, 1998, Chapter 12, pp. 523-562.

Linde et al., "An Algorithm for Vector Quantizer Design", *IEEE Transactions on Communication COM—28*, 1980, 84-95.

Lokovic, "Deep Shadow Maps", *SIGGRAPH 2000*, pp. 385-392.

Malzbender et al., "Polynomial Texture Maps", *SIGGRAPH 2001*, pp. 519-528.

Max, "Horizon mapping: shadows for bump-mapped surfaces", *The Visual Computer*, Jul. 1998, pp. 109-117.

Miller, "Efficient Algorithims for Local and Global Accessibility Shading", *SIGGRAPH 1994*, pp. 319-326.

Nimeroff et al., "Efficient Re-rendering of Naturally Illuminated Environments", Eurographics Workshop on Rendering 1994, pp. 359-373.

Purcell et al., "Ray Tracing on Programmable Graphics Hardware", *SIGGRAPH 2002*, pp. 703-712.

Ramamoorthi et al., "An Efficient Representation for Irradiance Environment Maps", *SIGGRAPH 2001*, pp. 497-500.

Ramamoorthi et al. "Frequency Space Environment Map Rendering", *ACM 2002*, pp. 517-526.

Reeves et al., "Rendering Antialiased Shadows with Depth Maps", *SIGGRAPH 1987*, pp. 283-291.

Segal et al., "Fast Shadows and Lighting Effects Using Texture Mapping", *SIGGRAPH 1992*, pp. 249-252.

Schröder et al., "Spherical Wavelets: Efficiently Representing Function on the Sphere", *SIGGRAPH 1995*, pp. 161-172.

Sillion et al., "A Global Illumination Solution for General Reflectance Distributions", *SIGGRAPH 1991*, pp. 187-196.

Sloan et al., "Computing Precomputed Radiance Transfer on the GPU", *SIGGRAPH 2003*, pp. 382-391.

Sloan et al., "Precomputed Radiance Transfer for Real-Time Rendering in Dynamic, Low-Frequency Lighting Environments", *SIGGRAPH 2002*, pp. 527-536.

Sloan et al., "Clustered Principal Components for Precomputed Radiance Transfer", *SIGGRAPH 2003* (To Appear), pp. 382-391.

Sloan et al., "Bi-Scale Radiance Transfer", *SIGGRAPH 2003* (To Appear), pp. 370-375.

Soler et al., "Fast Calculation of Soft Shadow Textures Using Convolution", *SIGGRAPH 1998*, pp. 321-332.

Teo et al., "Efficient Linear Re-rendering for Interactive Lighting Design", *Oct. 1997 Report No. STAN-CS-TN-97-60*, Stanford University, pp. 1-17.

Ward et al., "A Ray Tracing Solution for Diffuse Interreflection", *SIGGRAPH 1988*, pp. 85-92.

Westin et al., "Predicting Reflectance Functions from Complex Surfaces", *SIGGRAPH 1992*, pp. 255-264.

Williams, "Casting Curved Shadows on Curved Surfaces", *SIGGRAPH 1978*, pp. 270-274.

Zare, "Angular Momentum: Understanding Spatial Aspects in Chemistry and Physics", *Wiley*, New York, 1987.

\* cited by examiner

Software 680 Implementing Hardware-Accelerated PRT Preprocess

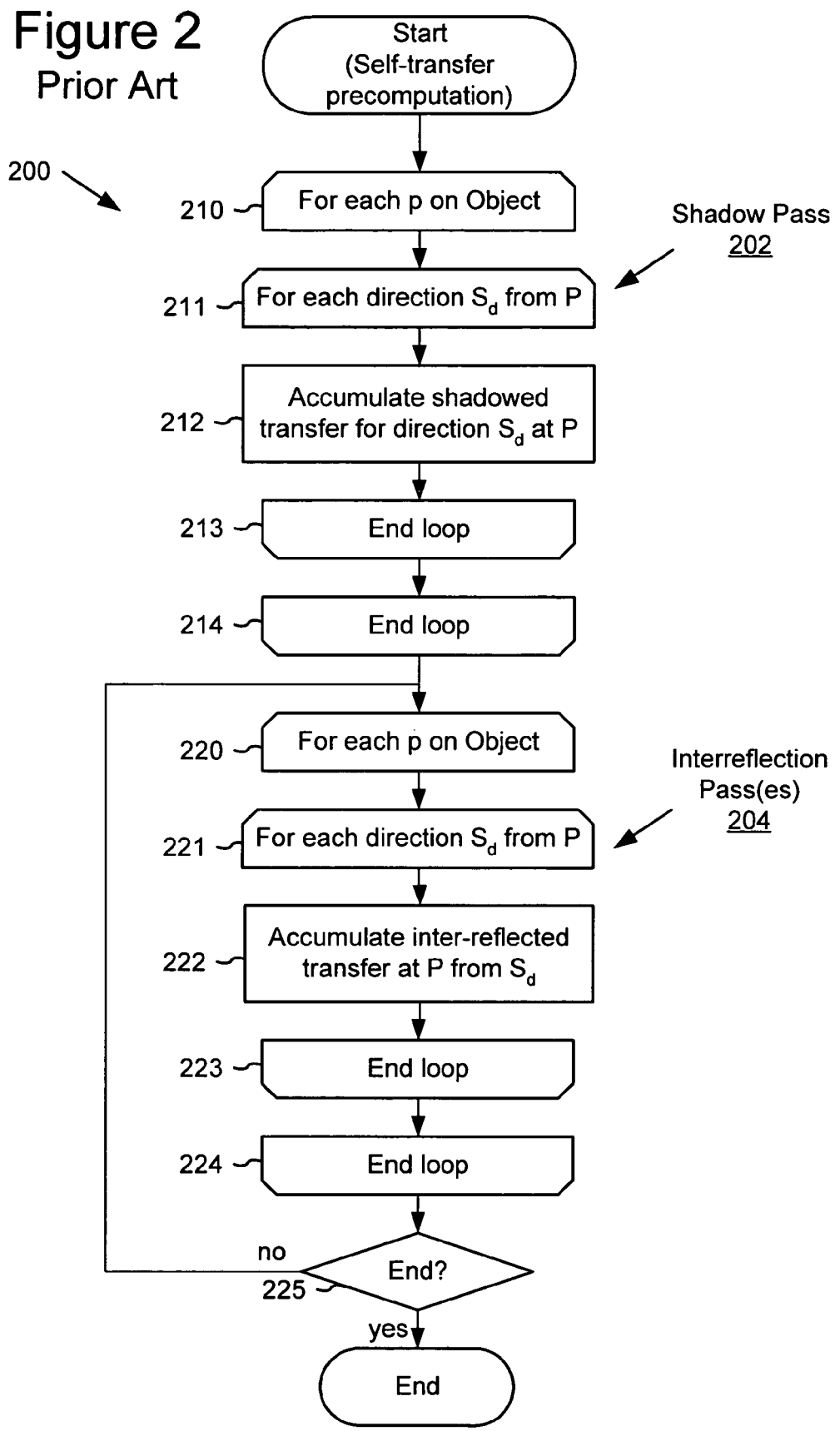

Figure 3
Prior Art

```
300  For each point P
         Accum = 0
         For each direction D
             Hn = dot(D,N)
             if (Hn < 0) continue;
             if (RayDoesNotIntersect(P,D))
                 Accum += B(D)*Hn
         End For
         T = Accum/Norm
     End For
```

Figure 4

```
400  For each direction D
         Render a view of the object from D - just
         storing the depth in a high precision
         buffer SB For each point P // encoded in G
             Hn = dot(D,N)
             if (Hn < 0) continue; // not on
         hemisphere
             SPos  = project(P,D)
             Zd =Lookup Spos.xy in SB
             if (SPos.z <= Zd) continue; //
         shadowed
                 Accum += Hn*B(D)
         End For
     End For
```

```
ps.2.0
;--------------------------
; Constants specified by the app
;
; c0-2  transformation into shadzbuff coordinates
;       xy values are mapped directly to texture
coordinates
; c3    direction vector for lighting
; c4-c7 sh coefficients for direction
; c8    is "default" texture coordinates - (0,0)

def c8, 0.0, 0.0, 0.0, 0.0 dcl t0;    // uv coordinates dcl_2d s0; // geometry texture
dcl_2d s1; // normal texture
dcl_2d s2; // shadow zbuffer // 1st sample the geom/normal from the source textures texld r3, t0, s0;
texld r4, t0, s1; // should have a homogenous 1...

// normalizes the normal - not strictly neccesary
dp3 r0, r4, r4
rcp r0.x, r0.x
mul r0, r0.x, r4

// r0 is now the normalized normal
// compute dot product of normal with direction
dp3 r0, r0, c3

// r1 is going to be the transformed point
dp4 r1.x, r3, c0
dp4 r1.y, r3, c1
dp4 r1.z, r3, c2

// fudge texture coordinates if dot(N,V) < 0
// makes it more cache coherent
cmp r1.xy, r0, r1, c8

// sample the shadow buffer
texld r2, r1, s2

// do the subtraction
add r2, -r1.z, r2.x

// compute the clamped cosine value
cmp r0, r0, r0, c8
// compute the "multiplication" value - cos or zero
cmp r0, r2, r0, c8

// now move the 16 coefficients into the MRT
mul r1, r0, c4
mov oC0, r1
mul r1, r0, c5
mov oC1, r1
mul r1, r0, c6
mov oC2, r1
mul r1, r0, c7
mov oC3, r1
```

```
ps.2.0
;---------------------------
; Constants specified by the app
;
; c0      vectors of 1's
; c1-c4   red   lighting coefs
; c5-c8   green lighting coefs
; c9-c12  blue  lighting coefs def c0, 1.0, 1.0, 1.0, 1.0 dcl t0;     // texture coords dcl_2d s0;  // 1st set of coefs
dcl_2d s1;  // 2nd set of coefs
dcl_2d s2;  // 3rd set of coefs
dcl_2d s3;  // 4th set of coefs // load the transfer coefficints
texld r0, t0, s0
texld r1, t0, s1
texld r2, t0, s2
texld r3, t0, s3

// accumulate 4 parts of the red dot product
mul r4, r0, c1
mad r4, r1, c2, r4
mad r4, r2, c3, r4
mad r4, r3, c4, r4
// sum across the 4 parts
dp4 r5.r, r4, c0

// accumulate 4 parts of the green dot product
mul r4, r0, c5
mad r4, r1, c6, r4
mad r4, r2, c7, r4
mad r4, r3, c8, r4
// sum across the 4 parts
dp4 r5.g, r4, c0

// accumulate 4 parts of the blue dot product
mul r4, r0, c9
mad r4, r1, c10, r4
mad r4, r2, c11, r4
mad r4, r3, c12, r4
// sum across the 4 parts
dp4 r5.b, r4, c0

// shove something in the alpha channel
mov r5.a, c0.r

//output the color mov oC0, r5
```

HARDWARE-ACCELERATED COMPUTATION OF RADIANCE TRANSFER COEFFICIENTS IN COMPUTER GRAPHICS

TECHNICAL FIELD

The invention relates generally to computer graphics techniques for rendering images of a modeled object with realistic lighting.

BACKGROUND

Generating accurate depictions of complex scenes in interesting lighting environments is one of the primary goals in computer graphics. The general solution to this problem requires the solution of an integral equation that is difficult to solve even in non-interactive settings. In interactive graphics, short cuts are generally made by making simplifying assumptions of several properties of the scene; the materials are generally assumed to be simple, the lighting environment is either approximated with a small number of point and directional lights, or environment maps and transport complexity (i.e., how the light bounces around the scene, such as, inter-reflections, caustics and shadows) is only modeled in a limited way. For example, shadows may be computed for dynamic point lights, but not for environment maps.

Pre-Computed Radiance Transfer

Sloan et al., "Graphics Image Rendering With Radiance Self-Transfer For Low-Frequency Lighting Environments", U.S. patent application Ser. No. 10/389,553, filed Mar. 14, 2003, and published as Publication No. US-2003-0179197-A1 (the disclosure of which is hereby incorporated by reference) [hereafter "Sloan '553 application"], describes a technique called "precomputed radiance transfer" (PRT) that enables rigid objects to be illuminated in low frequency lighting environments with global effects like soft shadows and inter-reflections in real time. It achieves these results by running a lengthy pre-process that computes how light is transferred from a source environment to exit radiance at a point. Previous methods for running this pre-process were designed to execute on the central processing unit (CPU) of a computer, and utilized the processing and memory resources of the CPU in a traditional manner.

Graphics Processing Unit

Computers commonly have a graphics adapter or graphics accelerator that contains a specialized microprocessor, generally known as a graphics co-processor or graphics processing unit (GPU). A GPU also can be integrated into the chip set contained on the motherboard of the computer. The GPU handles high-speed graphics-related processing to free the computer's central processing unit (CPU) for other tasks. Today's graphics adapters (e.g., various graphics adapter models available from NVIDIA and ATI Technologies, among others) feature GPUs that are specifically designed to render 3-dimensional (3D) graphics images and video at high frame rates, such as for use in computer games, video and other graphics intensive applications. Some CPUs for computers also include specialized instructions in their instruction sets that are designed for graphics-related processing (e.g., the MMX instructions in Intel Corporation microprocessors).

In past graphics adapters, the GPU generally provided fixed functionality for graphics processing operations. Application programs (e.g., a game with 3D graphics) would interact with the graphics adapter through a graphics application programming interface (API), such as Microsoft Corporation's DirectX®, and OpenGL® of Silicon Graphics, Inc. Through a graphics API, the application programs directed the GPU to execute its fixed graphics processing functions.

In its version 8, Microsoft DirectX® more recently introduced the concept of a programmable graphics shader for recent programmable graphics hardware. A shader is a program that executes on graphics hardware to perform graphics processing on a per pixel, or per vertex (or other graphics component or fragment) basis for 3D graphics rendering. DirectX® 8 included a language for writing shaders. DirectX® version 9 further introduced a high level programming language for shaders (called the High Level Shading Language or HLSL) to make it easier for application developers to create shaders. The HLSL is syntactically similar to the well known C programming language. This makes it easier for programmers who are familiar with C to understand.

The architecture or design of current GPUs is optimized to execute particular graphics operations, but has limitations that prevent practical and efficient execution of others. The PRT preprocessing technique as previously implemented on the CPU includes operations that do not execute efficiently on the GPU. Accordingly, a direct mapping of the previous PRT preprocessing technique from the CPU onto GPU hardware would not be practical or efficient. For example, current GPUs do not practically or efficiently execute reduction operations, ray tracing, rasterization, as well as providing slow read-back paths, among others. In particular, the computations in the previous CPU-based PRT preprocessing technique that involve iterating over vertices and shooting rays do not map well to current GPU hardware.

SUMMARY

A technique for hardware-accelerated computation of radiance transfer coefficients described herein is designed for practical and efficient execution on the GPU. The technique optimizes the radiance transfer computation to take into account the strengths and weaknesses of GPU architectures versus that of the CPU.

In one implementation, this hardware-accelerated radiance transfer computation technique is applied to precomputation of the PRT on the GPU. For efficient PRT pre-processing on the GPU, the computation is re-ordered relative to the previous PRT preprocessing technique on the CPU. In particular, the hardware-accelerated radiance transfer computation iterates over a sampling of directions about an object, as compared to iterating over points sampled over the object as in the previous PRT preprocessing technique. This enables the inner loop of the computation to be performed using a pixel shader as operations on a set of textures representing positions and normals of a set of sampling points over the object mapped into texture space. In this inner loop of the computation, a texture is computed containing the depth of the object for the currently iterated direction, the radiance transfer contribution for the direction at the position in the texture is calculated, and the texture for the direction is accumulated into texture representing the final transfer coefficients.

Additional features and advantages of the invention will be made apparent from the following detailed description of embodiments that proceeds with reference to the accompanying drawings.

BRIEF DESCRIPTION OF THE DRAWINGS

FIG. 2 is a flow diagram of a previous PRT preprocessing technique.

FIG. 3 is a pseudo-code listing of the previous PRT pre-processing technique.

FIG. 4 is a pseudo-code listing of a radiance transfer computation suitable for hardware-accelerated execution, such as on a GPU.

FIG. 7 is a code listing of a pixel shader for execution on a GPU to perform the update in an inner-loop of the hardware-accelerated radiance transfer computation of FIG. 4.

FIG. 8 is a code listing of a pixel shader for execution on a GPU to perform image rendering based on the pre-computed radiance transfer.

DETAILED DESCRIPTION

Figure 1:
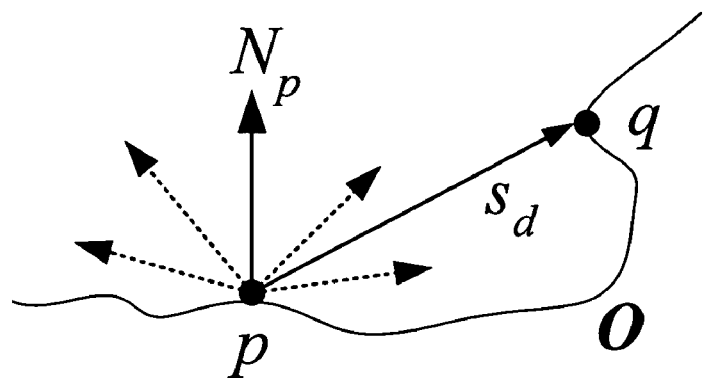
FIG. 1 is a drawing depicting the integration of radiance transfer for radiance-transfer precomputation.

The following description is directed to various implementations of techniques for hardware-accelerated computation of radiance transfer coefficients. The description presents an exemplary application of this technique to computer graphics image rendering based on pre-computed radiance transfer (PRT), such as described in the Sloan '553 application. More particularly, an exemplary application of the technique evaluates the PRT preprocess for diffuse objects with shadows efficiently on the GPU. However, the hardware-accelerated computation of radiance transfer coefficients alternatively can be applied to other image rendering applications in computer graphics.

1. Precomputed Radiance Transfer Overview

As described more fully in the Sloan '553 application, PRT is a technique that enables rendering images of rigid objects illuminated in low frequency lighting environments with global effects like soft shadows and inter-reflections in real time. The technique achieves this by running a lengthy preprocess that computes how light is transferred from a source environment to exit radiance at a point. The following section summarizes the basis of this PRT technique.

For a diffuse object illuminated in distant lighting environment L, the reflected radiance at a point P on the surface is:

$$R_P(\vec{v}) = \frac{\rho_d}{\pi} \int_s L(s) V_P(s) H_N(s) ds \qquad (1)$$

Where $V_p$ represent visibility; a binary function that is 1 in a given direction if a ray in that direction originating at the point can "see" the light source, and 0 otherwise. $H_N$ represents the projected area (or cosine term) and the integration is over the hemisphere about the points normal. The diffuse reflectance (or albedo) of the surface is $\rho_d$ and is generally a RGB color where each values is in between zero and one. The division by $\pi$ maps irradiance (the integral) into exit radiance (what we see) and guarantees energy conservation (i.e., the amount of energy reflected is never greater then the amount of energy arriving at a point.)

With a point or directional light, the lighting environment is effectively a delta function, which turns the integral into a simple function evaluation—the cosine of the angle between the light and the normal if the direction is not in shadow or just zero if it is. Since the object is diffuse, the reflected radiance is the same in all directions and the integral does not depend on the view direction. The key idea behind precomputed radiance transfer is to approximate the lighting environment using a set of basis functions over the sphere:

$$L(\vec{s}) \approx \sum_i l_i B_i(\vec{s}) \qquad (1)$$

Where the B's are a set of basis functions and the l's are the coefficients corresponding to the optimal (in a least squares sense) projection of the lighting environment into the basis functions, that is they minimize:

$$\int \left( L(\vec{s}) - \sum_i l_i B_i(\vec{s}) \right)^2 ds \qquad (2)$$

If the basis functions are orthogonal this just amounts to integrating the lighting environment against the basis functions, while in general it is necessary to integrate against the duals of the basis functions.

Now substitute the approximation of the lighting environment into (1):

$$R_P(\vec{v}) \approx \frac{\rho_d}{\pi} \int_s \left( \sum_i l_i B_i(\vec{s}) \right) V_P(\vec{s}) H_N(\vec{s}) ds \qquad (3)$$

And now recall two concepts from basic calculus: that the integral of a sum equals the sum of the integrals and that constants-can be pulled outside of integrals. This allows us to reformulate (3) as follows:

$$R_P(\vec{v}) \approx \rho_d \sum_i l_i \int_s \frac{1}{\pi} B_i(\vec{s}) V_P(\vec{s}) H_N(\vec{s}) ds \qquad (4)$$

The important thing to note about the above equation is that the integral only depends on the choice of basis functions, not on the value of the particular lighting environment or the albedo of the surface. This means that if you precompute the integral for each basis function at every point on the object you are left with the following expression for reflected radiance:

$$R_P(\vec{v}) \approx \rho_d \sum_i l_i t_{pi} \qquad (5)$$

A dot product between the global lighting coefficients and the spatially varying (through the index p) transfer vector scaled by the albedo is all that is required. One implementation of the hardware-accelerated radiance transfer technique described herein is efficient computation of $t_{pi}$.

2. Previous PRT Pre-Computation

With reference now to FIGS. 1-3, the Sloan '553 application presents a pre-process 200 (FIG. 2) for computing the PRT of an object. In this pre-process, the radiance transfer including shadow effects is first computed in a first "shadow" pass 202, then the contribution to radiance transfer from interreflections is computed in one or more additional "interreflection" passes 204. In the shadow pass 202, the preprocess iterates over a set of points (e.g., vertices) on the object at 210. Then, in an inner loop at 211-213, the preprocess iterates over directions from the point (as depicted in FIG. 1), integrating the shadow transfer at the point over the directions. In the interreflections pass(es) 204, the preprocess again iterates over the points on the object at 220, now integrating interreflection transfer at the respective point over the occluded directions in inner loop 221-223'.

One example implementation of the hardware-accelerated radiance transfer technique described herein focuses on evaluating the PRT preprocess for diffuse objects with shadows efficiently on the GPU. In other words, the technique provides more efficient computation of the radiance transfer including shadows, which compares to the shadow pass 202 of the previous PRT preprocess 200. This previous preprocess for precomputing the PRT with shadow effects can be expressed in pseudo-code 300 as shown in FIG. 3.

For each point (P), this pseudo-code process 300 (FIG. 3) iterates over a set of uniform directions on the unit sphere (as in Monte-Carlo integration), only adding the contribution for the basis functions in the directions that can see the light (again, as depicted in FIG. 1). The contributions are just a numerical evaluation of the integral in equation (4) above, which is the basis functions times the cosine of the angle between the ray direction and the normal times the visibility function evaluated in the given direction. The normalization constant for monte-carlo integration is $$\frac{4\pi}{N},$$

where the surface area of the sphere is $4\pi$ and N is the number of samples. This gives the irradiance at each point. The process then divides by $\pi$ to turn that into the radiance leaving the point. This resulting radiance transfer coefficient for the point is then stored as part of the PRT data to be used in rendering images of the object with shadow effects, as also described in the Sloan '553 application.

Unfortunately, the previous PRT precomputation as expressed in the flow chart of FIG. 2 and the pseudo-code 300 of FIG. 3 is not suitable for efficient, accelerated execution on graphics hardware. The previous PRT precomputation technique requires ray tracing, which while possible to do on graphics hardware is not very efficient. Further, the previous PRT precomputation requires an accumulation of disparate points in space, which also can not be done very efficiently on the GPU.

3. Hardware-Accelerated Radiance Transfer Computation

In accordance with one implementation of the hardware-accelerated computation of radiance transfer coefficients technique, the PRT preprocess is altered to become more suitable for hardware-accelerated execution on a GPU. This altered or hardware-accelerated version of the PRT preprocess can be expressed in pseudo-code 400 as shown in FIG. 4. As compared to the previous PRT preprocess pseudo-code 300 of FIG. 3, the order of the inner- and outer-loops of the hardware-accelerated PRT preprocess 400 are reversed to be more suitable for GPU execution. In particular, while the previous PRT preprocess iterated over sample points on the object in the outer loop and over directions from the respective point in the inner loop, this hardware-accelerated PRT preprocess iterates over directions in the outer loop and points in the inner loop.

The hardware-accelerated PRT preprocess uses a couple of textures, which are defined as follows: object space position texture (G) is a texture that contains the position of each point mapped into texture space; and object space normal texture (N) is a texture with the same correspondence as above, but contains the surface normal at each sample instead of position. If the object has a parameterization, such parameterization can be used for mapping the position into texture space in the texture G. Otherwise, it is reasonable to simply pack the points or vertices into the texture in a coherent fashion.

Figure 5:
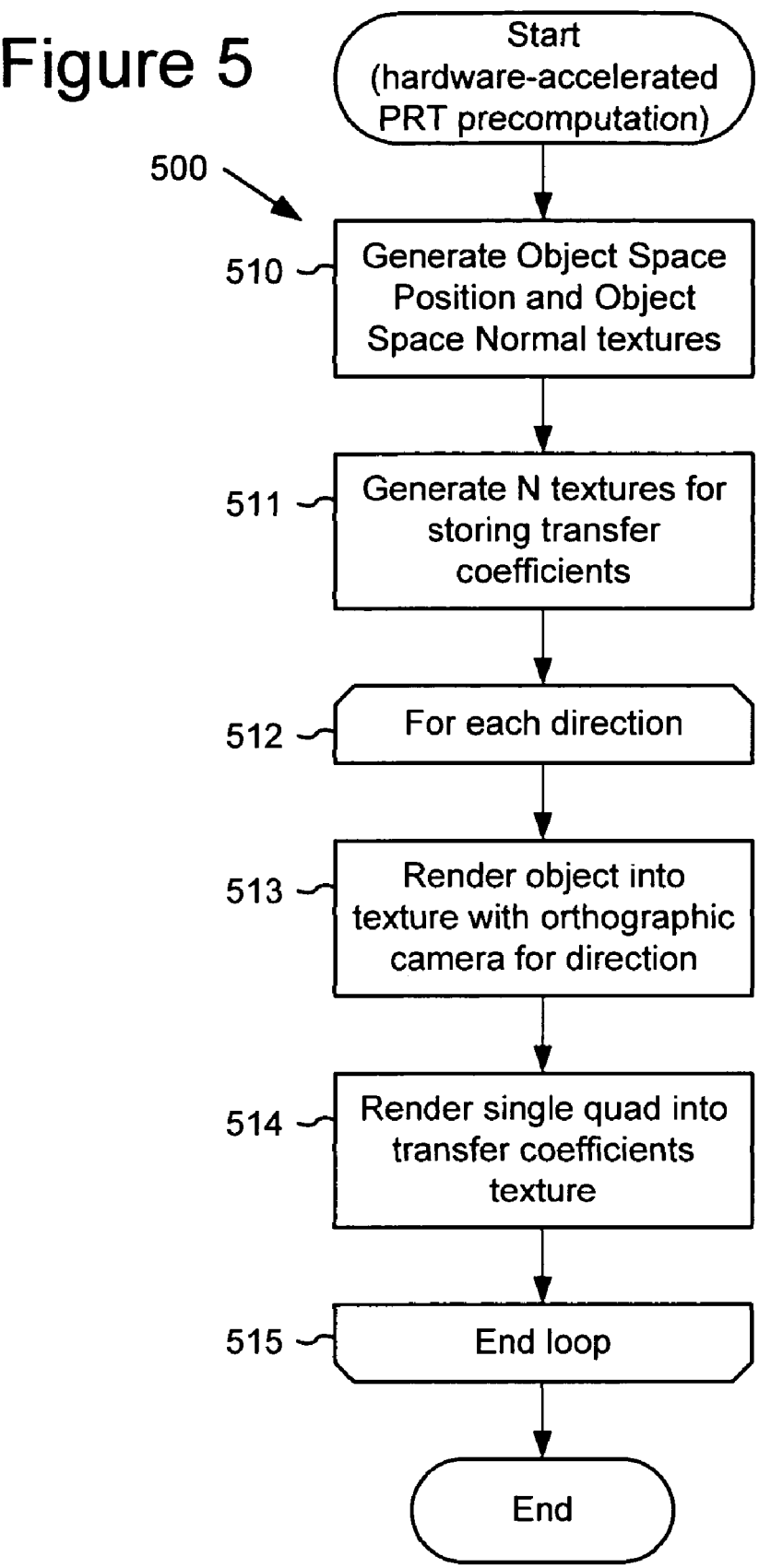
FIG. 5 is a flow diagram of the hardware-accelerated radiance transfer computation of FIG. 4.

With reference now to the flow chart depiction of the hardware-accelerated PRT preprocess 500 shown in FIG. 5 (which corresponds to the pseudo-code 400 in FIG. 4), the object space position (G) and object space normal (N) textures are first generated and initialized at 510. In one implementation, the object space position texture (G) is stored in RGB (red/green/blue) component form, using a 16-bit fixed or floating point number format. Alternative implementations can use different texture size and formats. In some implementations, the mapping of the position and normal into texture space can use a parameterization of the object, or a unique mapping of vertex to pixel. For example, when using PRT with textured objects, the objects can require unique texturing over the object surface. However, other implementations may use other mappings of the points into texture space, including arbitrary mappings that need not be a one-to-one parameterization. In some implementations, this unique point to texel mapping can be—performed using a conventional texture synthesis algorithm (as described in, e.g., Turk, G., *Texture Synthesis on Surfaces*, SIGGRAPH 2001, 347-354), which can use a texture atlas for the mapping (e.g., to minimize distortion). For example, any mapping of the sphere to a square by a single cut will have a lot of distortion, but if the sphere is broken into patches the individual patches will have much less distortion. In deciding the number of patches, a trade-off is made between inefficiencies from packing the patches into the texture and distortion. If a texture atlas is used, a "gutter" region preferably is defined and filled with valid values, so that bi-linear interpolation can be used. In this implementation of the hardware-accelerated PRT preprocess 500, the object is drawn once at a near depth and then 8 more times with single texel shifts and increased depths—effectively replicating the samples on the boundary into the gutters.

At 511, the hardware-accelerated PRT preprocess 500 builds a number N of textures to store the transfer coefficients, where N/4 is the number of basis functions used to represent the radiance transfer.

After initializing the textures, the hardware-accelerated PRT preprocess 500 iterates over a sampling of directions in a loop 512-515. In one implementation, the sampling of directions are generated as uniformly distributed points on a unit sphere, using a standard mapping from the unit square to the sphere and jittered sampling. These are the directions that are used to perform the numerical integration for the PRT precomputation.

In iterating over the direction in the loop 512-515, the hardware-accelerated PRT preprocess 500 performs the following basic computations 513-514 for radiance transfer with shadow (shadow pass): a texture is computed containing the depth of the object from that texture (a shadow z-buffer essentially) at 513 so as render the entire object (iterating over position effectively); the contribution for the given direction is computed in a texture; and finally this texture is accumulated into the final results at 514. The shadow Z buffer is a texture that stores the depth of the object in the direction (e.g., as a 16-bit fixed or floating point format). The shadow pass is fairly straightforward—an orthographic projection matrix is appended to a transformation that sets the view direction (the Z axis) to the current direction being computed. Care should be taken to generate as tight a frustum around the object as possible to maximize the texture's spatial resolution and precision. High precision textures should be used to store the depth (either 16 bit floating point or fixed point should suffice for most objects.)

Figure 6:
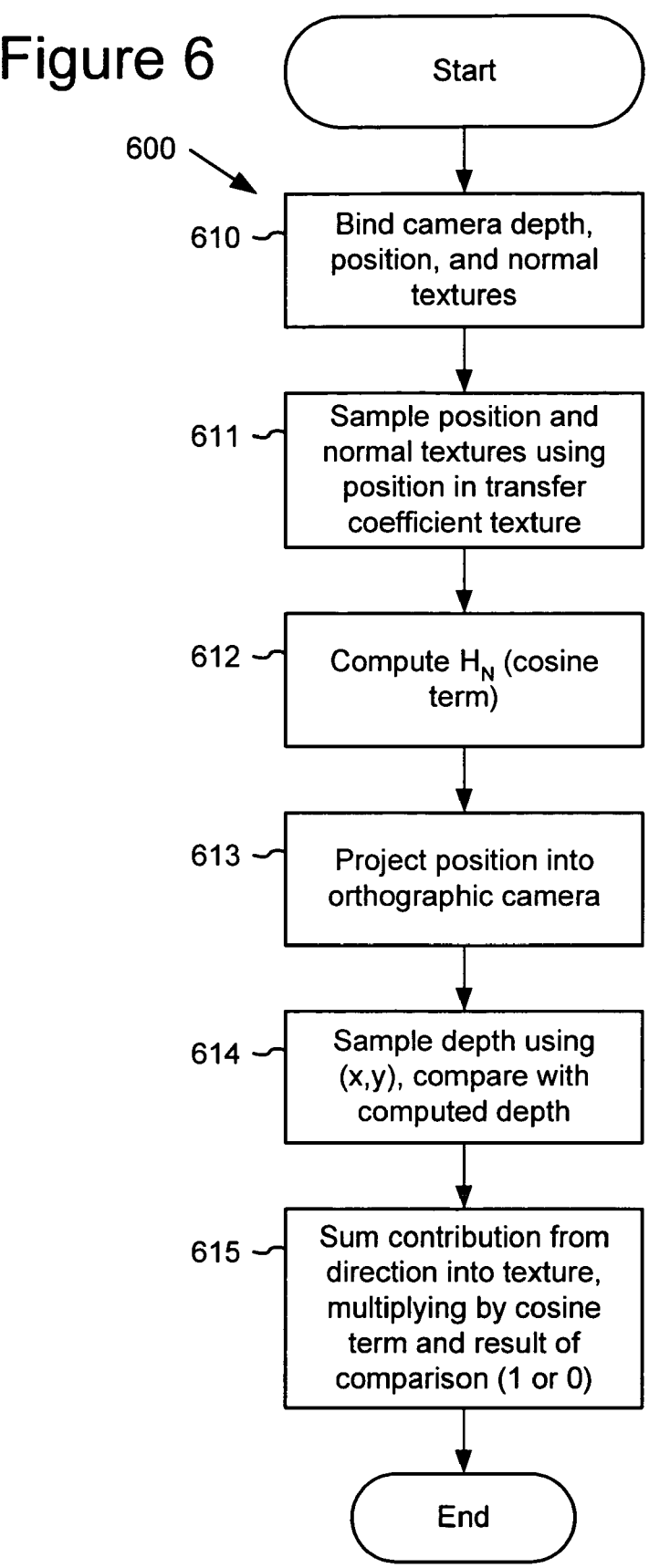
FIG. 6 is a flow diagram of a rendering pass within a computation loop in the hardware accelerated computation of radiance transfer coefficients of FIG. 5.

FIG. 6 shows the steps in this shadow pass inner loop 600 (corresponding to step 514 of FIG. 5) in more detail. At 610, the shadow pass inner loop binds the camera depth, position and normal textures. The loop then samples position and normal textures using the respective position in the transfer coefficient texture at 611. At 612, the loop computes the cosine term $H_N$ (from equation (4) above). The loop projects the position into the orthographic camera at 613. The loop samples depth using the position (x,y), and compares with the computed depth to determine visibility (i.e., occlusion or shadowing) at 614. The loop then sums the contribution from this direction into the radiance coefficient texture. The contribution is determined by multiplying by the cosine term, and the result of the visibility comparison (1 or 0).

In one implementation, the bulk of this shadow pass inner loop can be computed in a pixel shader 700 (whose assembly language listing 700 is shown in FIG. 7) on the GPU. In this pixel shader, simple geometry is drawn that rasterizes the corresponding UV coordinate for each pixel on the screen. A square can be used but a single triangle that encompasses the normalized device coordinates (NDC) is potentially more efficient. The vertex shader just maps from UV coordinates to NDC coordinates and emits the texture coordinates along with position. The transformation used for the pixel shader is identical to the one used in the vertex shader of the shadow pass but appended with a transformation from NDC coordinates to UV coordinates and biases the depth value to minimize "acne" that can occur with shadow depth buffer techniques.

For finally accumulating the contributions of the current direction into the radiance coefficients texture, it is unfortunately not possible to blend into floating point render targets with the current generation of graphics hardware. The hardware-accelerated PRT preprocess 500 overcomes this limitation in such GPUs by using three sets of buffers: a buffer (4 textures) that represents the most recent direction, a buffer that represents the previous frame's approximation of the integral, and a buffer that is two frames old. The hardware-accelerated PRT preprocess loads a further pixel shader that adds the current contribution into the most recent accumulation buffer, the roles of the accumulation buffers alternate every-frame (e.g., always accumulate into texture buffer (uDir)&1 and read from (uDir+1)&1.) The pixel shader has two constants that multiply each of the terms—the previously accumulated results are blended with a zero on the first update and a one after, and the current frame is always updated with the normalization factor 4/uNumDirections, where uNumDirections is a constant that represents the number of directions sampled by the hardware-accelerated PRT preprocess.

4. Final Rendering

When the hardware-accelerated PRT preprocess is finished, the resulting PRT data can be used to render images of the object in a lighting environment as described in the Sloan '533 application. In one implementation, this image rendering with PRT produced by the above-described hardware-accelerated PRT preprocess can use a pixel shader (shown in the assembly code listing 800 of FIG. 8) that computes the large dot products for the red, green and blue projection of the lighting environment. The contents of the texture could be transferred to a fixed point texture which can be filtered, such as with GPUs available from ATI Technologies, Inc. Care should be taken to maximize the precision when doing this— each channel can map its largest absolute value to one and then scale the corresponding coefficient of the lighting environment (which is always stored in high precision constant registers) by one over this scale factor. The projection coefficients of the lighting environment have to be rotated into the object space of the object. The sequence of muls/mads used in the pixel shader shown in listing 800 scales to larger dot products more efficiently than simply using dp4 instructions.

5. Alternative Implementations

There are several straightforward extensions and improvements that can be made to the hardware-accelerated PRT preprocess detailed above. Multiple directions can be done in a single pass by storing the four shadow z-buffers in the separate color channels of a single texture and having a longer pixel shader. If the directions are coherent, this should have reasonable cache performance, and would cut down on the number of accumulation steps that are necessary. This could also alleviate some of the precision issues associated with the accumulation step.

Further, ID buffers, percentage closer filtering, and angle dependent offsets can be used in the hardware-accelerated PRT preprocess to make the shadow depth buffering phase more accurate.

Finally, the normal texture can be analyzed and slightly more complex geometry can be used based on clustering normals. Only subregions that can have non-zero dot products with the current direction would have to be rasterized. More complex precomputed data structures also can be used to handle regions that can be conservatively classified as either completely shadowed or unshadowed from a given direction.

6. Computing Environment

The above described technique for hardware-acceleration of radiance transfer coefficients computation (such as, the above-detailed hardware-accelerated PRT preprocess 500 (FIG. 5)) can be implemented on any of a variety of computing devices and environments that include hardware graphics accelerators (e.g., GPUs), including computers of various form factors (personal, workstation, server, handheld, laptop, tablet, or other mobile), distributed computing networks, and Web services, as a few general examples.

Figure 9:
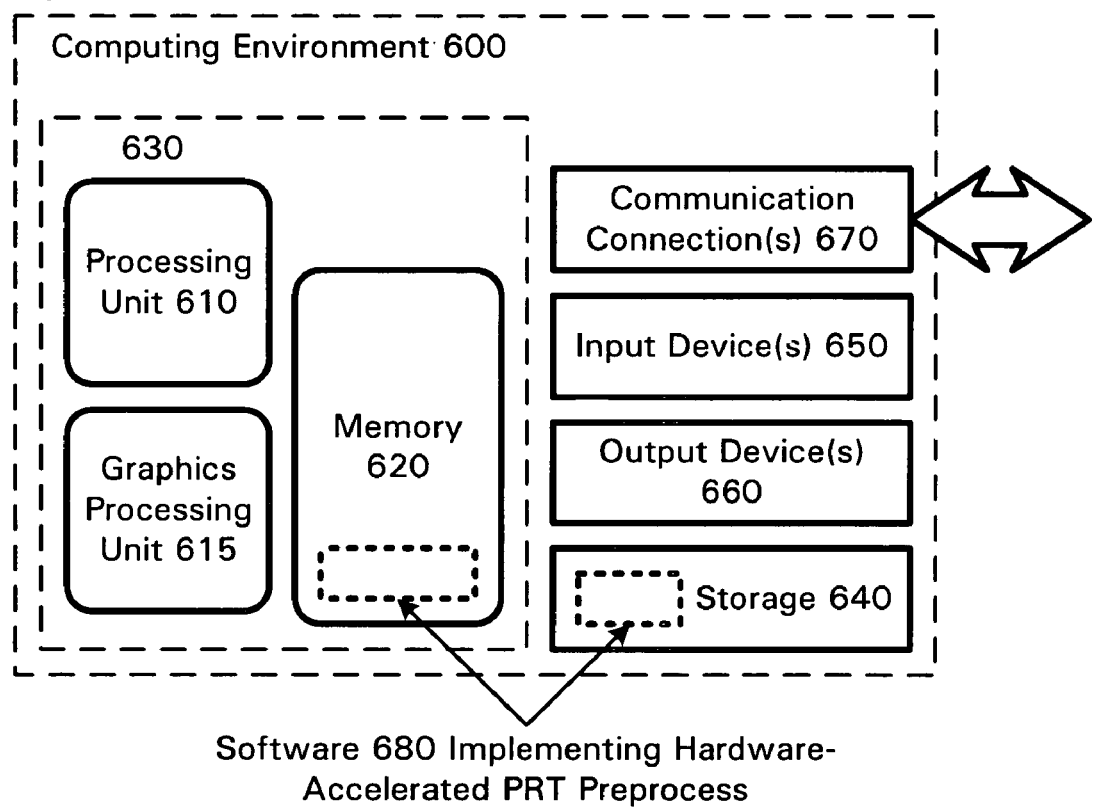
FIG. 9 is a block diagram of a suitable computing environment for implementing the hardware-accelerated radiance transfer computation of FIG. 1.

FIG. 9 illustrates a generalized example of a suitable computing environment 900 in which the described techniques can be implemented. The computing environment 900 is not intended to suggest any limitation as to scope of use or functionality of the invention, as the present invention may be implemented in diverse general-purpose or special-purpose computing environments.

With reference to FIG. 9, the computing environment 900 includes at least one processing unit 910 and memory 920, as well as the graphics processing unit 915. In FIG. 9, this most basic configuration 930 is included within a dashed line; The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. The memory 920 stores software 980 implementing the hardware-accelerated graphics transfer coefficients computation technique. The graphics processing unit 915 is a specialized microprocessor that handles high-speed graphics-related processing, such as may be provided on a graphics adapter or integrated into the chip set contained on the motherboard of the computer (e.g., various graphics adapter models currently available from NVIDIA and ATI Technologies, among others). Preferably, the graphics processing unit 915 is programmable, so as to support executing pixel shaders.

A computing environment may have additional features. For example, the computing environment 900 includes storage 940, one or more input devices 950, one or more output devices 960; and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for the device connectivity and networking software 980.

The input device(s) 950 (e.g., for devices operating as a control point in the device connectivity architecture 100) may be a touch input device such as a keyboard, mouse, pen, or trackball, a voice input device, a scanning device, or another device that provides input to the computing environment 900. For audio, the input device(s) 950 may be a sound card or similar device that accepts audio input in analog or digital form, or a CD-ROM reader that provides audio samples to the computing environment. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The hardware-accelerated radiance transfer coefficients computation techniques herein can be described in the general context of computer-readable media. Computer-readable media are any available media that can be accessed within a computing environment. By way of example, and not limitation, with the computing environment 900, computer-readable media include memory 920, storage 940, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of producing radiance transfer coefficients for a set of points sampled over a modeled object for rendering images of the object on a computer having a graphics processing unit for performing operations over sets of data values contained in textures, the method comprising:
    creating an object positions texture containing a set of data values representing positions of a set of points sampled over the object mapped into a texture space;
    creating an object normals texture containing a set of data values representing normals of the set of sampled points mapped into the texture space;
    iteratively, for each of a set of directions sampled about the object,
        rendering the object from the direction to produce a shadow buffer representing depth from the object in the direction for the set of points;
        as a texture-based operation using the graphics processing unit, determining cosine terms of the set of sampled points for the currently iterated direction based on the normals represented in the object normals texture and currently iterated direction;
        as a texture-based operation using the graphics processing unit, determining shadowing of the set of sampled points for the currently iterated direction based on the depths represented in the shadow buffer and positions represented in the object positions texture;
        as a texture-based operation using the graphics processing unit, determining radiance transfer contribution of the set of sampled points for the currently iterated direction based on the determined cosine terms and shadowing; and
        accumulating the radiance transfer contributions of the set of sampled points for the currently iterated direction with that of previously iterated directions;
    producing a radiance transfer value for each of the sampled points from the accumulated radiance transfer contributions for the iterated directions at the respective sampled points;
    rendering an image of the object in a lighting environment based on the accumulated radiance transfer contributions; and
    presenting the image.

2. A computer system for hardware-accelerated processing of a radiance transfer coefficients computation for a set of points sampled over a modeled object for use in rendering images of the object, the computer system comprising:
    a memory for storing program code of at least one pixel shader and a radiance transfer coefficients processing program;
    a central processing unit operating to execute the radiance transfer coefficients processing program;
    a graphics processing unit programmable by and operating to execute the at least one pixel shader;
    wherein the radiance transfer coefficients processing program executing on the central processing unit creates an object positions texture that contains data values representing positions of a set of points sampled over the object mapped into a texture space, and creates an object normals texture that contains data values representing normals of the set of sampled points mapped into the texture space;

wherein the at least one pixel shader executing on the graphics processing unit performs texture operations that iteratively, for each of a set of directions sampled about the object, render the object from the direction to produce a shadow buffer representing depth from the object in the direction for the set of points;

determine cosine terms of the set of sampled points for the currently iterated direction based on the normals represented in the object normals texture and currently iterated direction;

determine shadowing of the set of sampled points for the currently iterated direction based on the depths represented in the shadow buffer and positions represented in the object positions texture;

determine radiance transfer contribution of the set of sampled points for the currently iterated direction based on the determined cosine terms and shadowing; and accumulate the radiance transfer contributions of the set of sampled points for the currently iterated direction with that of previously iterated directions; and wherein the graphics processing unit produces a radiance transfer value for each of the sampled points from the accumulated radiance transfer contributions for the iterated directions at the respective sampled points.

3. Computer-readable storage media having stored thereon programming code executable at least in part on graphics accelerating hardware on a computer to perform processing of a radiance transfer coefficients computation for a set of points sampled over a modeled object for use in rendering images of the object, the computer-readable storage media not consisting of a signal, the programming code comprising:

code means executable on a computer for creating an object positions texture that contains data values representing positions of a set of points sampled over the object mapped into a texture space;

code means executable on a computer for creating an object normals texture that contains data values representing normals of the set of sampled points mapped into the texture space;

code means executable on the graphics accelerating hardware of the computer to perform texture-based operations that iteratively, for each of a set of directions sampled about the object, render the object from the direction to produce a shadow buffer representing depth from the object in the direction for the set of points;

determine cosine terms of the set of sampled points for the currently iterated direction based on the normals represented in the object normals texture and currently iterated direction;

determine shadowing of the set of sampled points for the currently iterated direction based on the depths represented in the shadow buffer and positions represented in the object positions texture;

determine radiance transfer contribution of the set of sampled points for the currently iterated direction based on the determined cosine terms and shadowing; and accumulate the radiance transfer contributions of the set of sampled points for the currently iterated direction with that of previously iterated directions; and code means executable on the computer to produce a radiance transfer value for each of the sampled points from the accumulated radiance transfer contributions for the iterated directions at the respective sampled points.

4. The method of claim 1 wherein the texture-based operations for determining cosine terms, determining shadowing, determining radiance transfer contributions, and said accumulating radiance transfer contributions form an inner computational loop that iterates over the sampled points, and wherein an outer computational loop iteratively repeats the inner computational loop over the set of sampled directions.

5. The computer system of claim 2 wherein the texture operations that render, determine cosine terms, determine shadowing, determine and accumulate radiance transfer contributions form an inner computational loop that iterates over the sampled points, and wherein an outer computational loop iteratively repeats the inner computational loop over the set of sampled directions.

6. The method of claim 1 wherein the object positions texture contains an arrangement of data values representing the position of each of the sampled points mapped into the texture space.

7. The method of claim 4 wherein the object positions texture is stored in an RGB component format.

8. The method of claim 1 wherein the object normals texture contains an arrangement of data values representing the surface normal at each of the sampled points mapped into the texture space.

9. The method of claim 1 wherein the set of directions are generated as uniformly distributed points on a unit sphere based on a mapping from the unit square to the sphere and jittered sampling.

10. The method of claim 1 wherein said determining cosine terms, determining shadowing, determining radiance transfer contribution, and accumulating the radiance transfer contributions are performed using a pixel shader executed on a programmable graphics processing unit.

11. The method of claim 1 wherein said rendering the object from the direction comprises rendering the object as an orthographic camera projection whose view direction is set to the current direction.

12. The method of claim 11 wherein said determining shadowing comprises for each of the sampled points:

computing depth of a current sampled point based on the current sampled point's position as represented in the object positions texture;

comparing the computed depth of the current sampled point to an object depth from the current direction as represented in the shadow buffer to determine visibility of the current sampled point in the current direction.

13. The computer system of claim 2 wherein the object positions texture contains an arrangement of data values representing the position of each of the sampled points mapped into the texture space.

14. The computer system of claim 2 wherein the object positions texture is stored in a floating point number format.

15. The computer system of claim 2 wherein the object normals texture contains an arrangement of data values representing the surface normal at each of the sampled points mapped into the texture space.

16. The computer system of claim 2 wherein the set of directions are to uniformly distributed points on a unit sphere.

17. The computer system of claim 2 wherein said rendering the object from the direction comprises rendering the object as an orthographic camera projection whose view direction is set to the current direction.

18. The computer system of claim 17 wherein said determining shadowing comprises for each of the sampled points:
   computing depth of a current sampled point based on the current sampled point's position as represented in the object positions texture;
   comparing the computed depth of the current sampled point to an object depth from the current direction as represented in the shadow buffer to determine visibility of the current sampled point in the current direction.

19. The computer-readable storage media of claim 3 wherein said code means executable on the graphics accelerating hardware of the computer to perform texture-based operations is a pixel shader executable on a programmable graphics processing unit 20. The computer-readable storage media of claim 3 wherein said code means executable on the graphics accelerating hardware comprises an inner computational loop that iterate over the sample points as the texture operations that determine cosine terms, determine shadowing, determine and accumulate radiance transfer contributions from an inner computational loop; and an outer computational loop that iterates the inner computational loop over the set of sampled directions.

* * * * *